United States Patent
Park

(10) Patent No.: US 9,143,203 B2
(45) Date of Patent: Sep. 22, 2015

(54) NEAR FIELD COMMUNICATION SYSTEM, AND METHOD OF OPERATING SAME

(71) Applicant: Fitbit, Inc., San Francisco, CA (US)

(72) Inventor: James Park, Berkeley, CA (US)

(73) Assignee: Fitbit, Inc., San Francisco, CA (US)

( * ) Notice: Subject to any disclaimer, the term of this patent is extended or adjusted under 35 U.S.C. 154(b) by 0 days.

(21) Appl. No.: 14/477,628

(22) Filed: Sep. 4, 2014

(65) Prior Publication Data

US 2014/0375428 A1    Dec. 25, 2014

Related U.S. Application Data

(63) Continuation of application No. 13/785,904, filed on Mar. 5, 2013.

(60) Provisional application No. 61/606,559, filed on Mar. 5, 2012.

(51) Int. Cl.
*H04Q 5/22* (2006.01)
*H04B 5/00* (2006.01)
*G06K 7/10* (2006.01)

(52) U.S. Cl.
CPC .......... *H04B 5/0062* (2013.01); *G06K 7/10237* (2013.01)

(58) Field of Classification Search
None
See application file for complete search history.

(56) References Cited

U.S. PATENT DOCUMENTS

| 6,454,708 B1 * | 9/2002 | Ferguson et al. ............. 600/300 |
| 6,583,369 B2 | 6/2003 | Montagnino et al. |
| 8,947,239 B1 | 2/2015 | Park |
| 2003/0062001 A1 | 4/2003 | Andersson |
| 2004/0000713 A1 * | 1/2004 | Yamashita et al. ............. 257/728 |
| 2004/0116837 A1 * | 6/2004 | Yamaguchi et al. .......... 600/595 |
| 2006/0290496 A1 * | 12/2006 | Peeters ....................... 340/572.1 |
| 2007/0145119 A1 | 6/2007 | Rhelimi |
| 2007/0249470 A1 | 10/2007 | Niva et al. |
| 2008/0030324 A1 | 2/2008 | Bekritsky et al. |

(Continued)

FOREIGN PATENT DOCUMENTS

EP    1 721 237    8/2012

OTHER PUBLICATIONS

U.S. Appl. No. 13/785,904, filed Mar. 5, 2013, Park.

(Continued)

*Primary Examiner* — Curtis King
(74) *Attorney, Agent, or Firm* — Weaver Austin Villeneuve & Sampson LLP

(57) ABSTRACT

The present inventions, in one aspect, are directed to a system comprising a portable sensor device including a housing having a physical size/shape that is adapted to couple to a user's body, an identification tag including identification data which is associated with the sensor device and an identification tag transmitter to responsively and wirelessly transmit the identification data according to a first communication protocol. The system further includes a portable electronic device including an identification tag receiver to wirelessly receive the identification data of the identification tag according to the first communication protocol, transceiver circuitry to wirelessly and responsively communicate with the sensor device according to a second communication protocol, and processing circuitry to instruct the transceiver circuitry, after receiving the identification data, to wirelessly request, from the sensor device the sensor data and/or data which is representative of the sensor data.

22 Claims, 9 Drawing Sheets

(56) References Cited

U.S. PATENT DOCUMENTS

| | | | |
|---|---|---|---|
| 2008/0085778 A1 | 4/2008 | Dugan | |
| 2008/0129457 A1 | 6/2008 | Ritter et al. | |
| 2008/0281165 A1* | 11/2008 | Rai et al. | 600/300 |
| 2009/0021343 A1* | 1/2009 | Sinha | 340/5.2 |
| 2009/0088618 A1* | 4/2009 | Arneson et al. | 600/373 |
| 2010/0045463 A1 | 2/2010 | Bradley et al. | |
| 2010/0070618 A1* | 3/2010 | Kim et al. | 709/221 |
| 2010/0327057 A1* | 12/2010 | Medina et al. | 235/382.5 |
| 2010/0331145 A1 | 12/2010 | Lakovic et al. | |
| 2011/0032105 A1 | 2/2011 | Hoffman et al. | |
| 2011/0257576 A1* | 10/2011 | Simpson et al. | 604/4.01 |
| 2012/0050047 A1 | 3/2012 | Kim et al. | |
| 2012/0094649 A1 | 4/2012 | Porrati et al. | |
| 2012/0274508 A1 | 11/2012 | Brown et al. | |
| 2012/0293307 A1 | 11/2012 | Djuric et al. | |
| 2013/0060103 A1* | 3/2013 | Bergida et al. | 600/302 |
| 2013/0106684 A1 | 5/2013 | Weast et al. | |
| 2013/0191556 A1 | 7/2013 | Holmstadt | |
| 2013/0274705 A1* | 10/2013 | Burnes et al. | 604/505 |
| 2014/0099614 A1 | 4/2014 | Hu et al. | |
| 2015/0102914 A1 | 4/2015 | Park | |

OTHER PUBLICATIONS

US Office Action, dated Jun. 11, 2013, issued in U.S. Appl. No. 13/785,904 [FTBTP011].
US Office Action, dated Jan. 2, 2014, issued in U.S. Appl. No. 13/785,904 [FTBTP011].
US Final Office Action, dated May 12, 2014, issued in U.S. Appl. No. 13/785,904 [FTBTP011].
US Office Action, dated Aug. 14, 2014, issued in U.S. Appl. No. 13/785,904 [FTBTP011].
"Activator is One of the Best Cydia iPhone Hacks | Control your iPhone with Gestures," IPHONE-TIPS-AND-ADVICE.COM, [retrieved on Jul. 9, 2013 at http://www.iphone-tips-and-advice.com/activator.html], 10 pp.
Chudnow, Alan (Dec. 3, 2012) "Basis Wristband Make Its Debut," *The Wired Self Living in a Wired World*, published in Health [retrieved on Jul. 22, 2013 at http://thewiredself.com/health/basis-wrist-band-make-its-debut/], 3pp.
DesMarais, Christina (posted on Sep. 3, 2013) "Which New Activity Tracker is Best for You?" *Health and Home, Health & Fitness , Guides & Reviews*, [Retrieved on Sep. 23, 2013 at http://www.techlicious.com/guide/which-new-activity-tracker-is-right-for-you] 4 pp.
Empson, Rip, (Sep. 22, 2011) "Basis Reveals An Awesome New Affordable Heart and Health Tracker You Can Wear on Your Wrist," [retrieved on Sep. 23, 2013 at http://techcrunch.com/2011/09/22/basis-reveals-an-awesome-new . . .], 3 pp.
Fitbit User's Manual, Last Updated Oct. 22, 2009, 15 pages.

Forerunner® 10 Owner's Manual (Aug. 2012), Garmin Ltd., 10 pp.
Forerunner® 110 Owner's Manual, (2010) "GPS-Enabled Sport Watch," Garmin Ltd., 16 pp.
Forerunner® 201 personal trainer owner's manual, (Feb. 2006) Garmin Ltd., 48 pp.
Forerunner® 205/305 Owner's Manual, GPS-enabled trainer for runners, (2006-2008), Garmin Ltd., 80 pp.
Forerunner® 210 Owner's Manual, (2010) "GPS-Enabled Sport Watch," Garmin Ltd., 28 pp.
Forerunner® 301 personal trainer owner's manual, (Feb. 2006) Garmin Ltd., 66 pp.
Forerunner® 310XT Owner's Manual, Multisport GPS Training Device, (2009-2013), Garmin Ltd., 56 pp.
Forerunner® 405 Owner's Manual, (Mar. 2011) "GPS-Enabled Sport Watch With Wireless Sync," Garmin Ltd., 56 pp.
Forerunner® 405CX Owner's Manual, "GPS-Enabled Sports Watch With Wireless Sync," (Mar. 2009), Garmin Ltd., 56 pp.
Forerunner° 410 Owner's Manual, (Jul. 2012) "GPS-Enabled Sport Watch With Wireless Sync," Garmin Ltd., 52 pp.
Forerunner® 50 with ANT+Sport™ wireless technology, Owner's Manual, (Nov. 2007) Garmin Ltd., 44 pp.
Forerunner® 910XT Owner's Manual, (Jan. 2013) Garmin Ltd., 56 pp.
Garmin Swim™ Owner's Manual (Jun. 2012), 12 pp.
Lark/Larkpro, User Manual, (2012) "What's in the box," *Lark Technologies*, 7 pp.
Larklife, User Manual, (2012) *Lark Technologies*, 7 pp.
Nike+ FuelBand GPS Manual, User's Guide (Product Release Date Unknown, downloaded Jul. 22, 2013), 26 pages.
Nike+SportBand User's Guide, (Product Release Date Unknown, downloaded Jul. 22, 2013), 36 pages.
Nike+SportWatch GPS Manual, User's Guide, Powered by TOMTOM, (Product Release Date Unknown, downloaded Jul. 22, 2013), 42 pages.
"Parts of Your Band," (Product Release Date Unknown, downloaded Jul. 22, 2013) Jawbone UP Band, 1 page.
Polar WearLink® + Coded Transmitter 31 Coded Transmitter W.I.N. D. User Manual, Polar® Listen to Your Body, *Manufactured by Polar Electro Oy*, 11 pages.
Rainmaker, (Jun. 25, 2012, updated Feb. 16, 2013) "Garmin Swim watch In-Depth Review," [retrieved on Sep. 9, 2013 at http://www.dcrainmaker.com/2012/06/garmin-swim-in-depth-review.html, 38 pp.
US Notice of Allowance, dated Nov. 3, 2014, issued in U.S. Appl. No. 13/785,904 [FTBTP011].
U.S. Appl. No. 14/575,929, filed Dec. 12, 2014, Park.
US Office Action, dated Feb. 25, 2015, issued in U.S. Appl. No. 14/575,929 [FTBTP011C2].

* cited by examiner

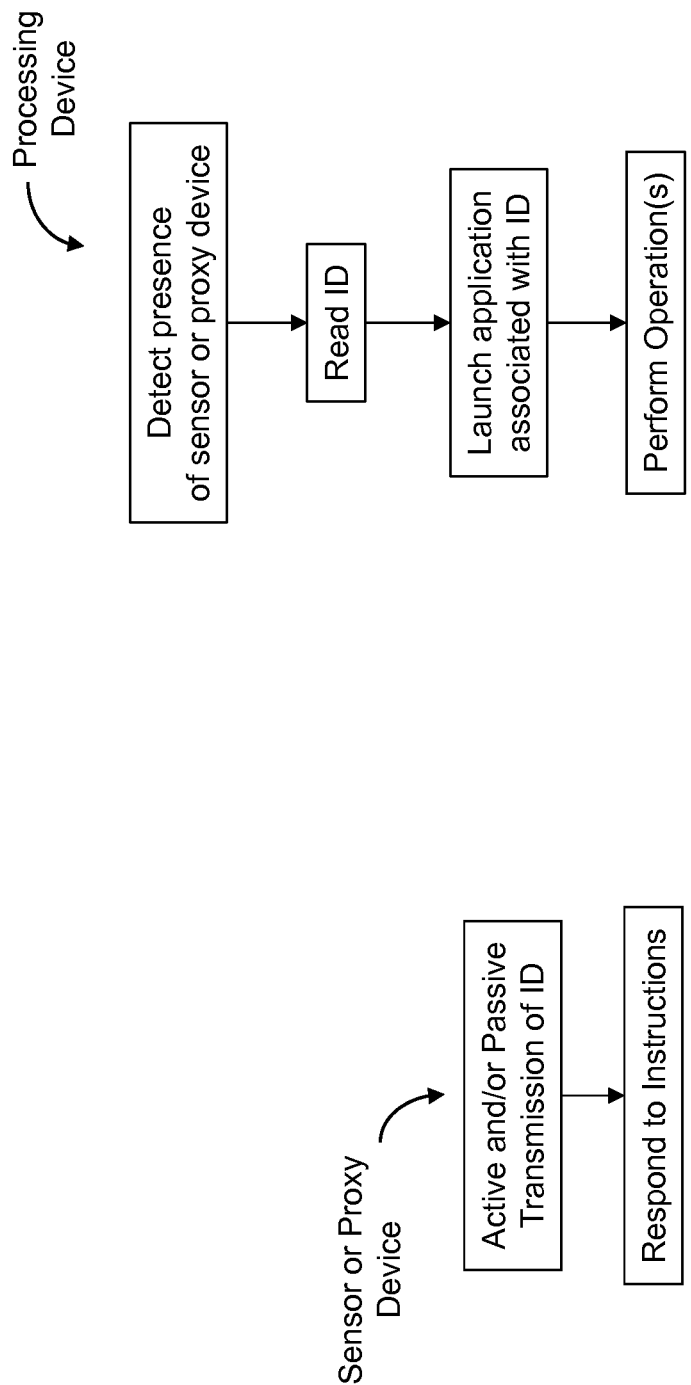

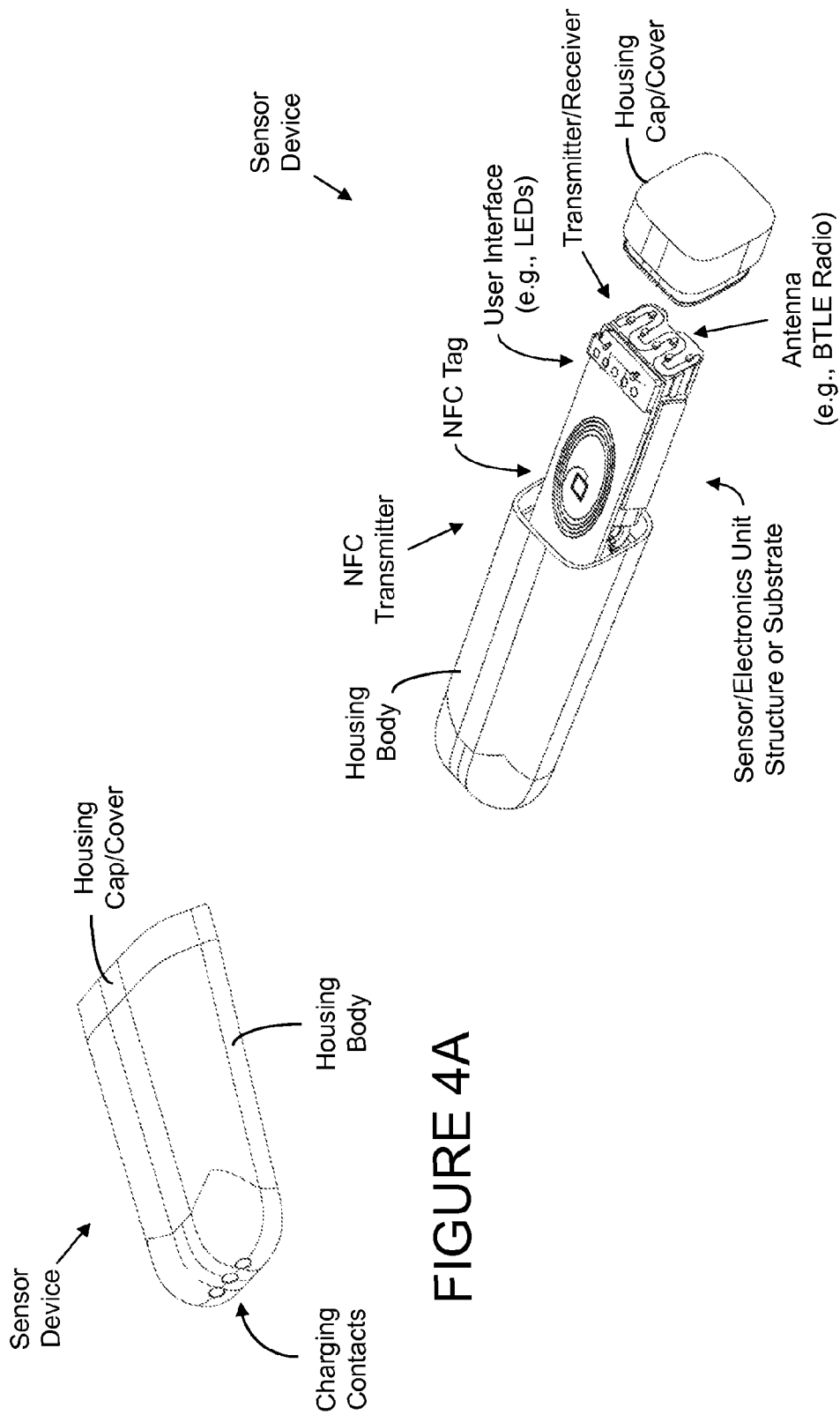

NEAR FIELD COMMUNICATION SYSTEM, AND METHOD OF OPERATING SAME

PRIORITY INFORMATION

This application is a Continuation of, and claims priority to, U.S. patent application Ser. No. 13/785,904 by Park, filed 5 Mar. 2013, and titled "Near Field Communication System, and Method of Operating Same," which claims priority to U.S. Provisional Application Ser. No. 61/606,559 by Park, filed 5 Mar. 2012, and titled "Near Field Communication System, and Method of Operating Same," both of which Applications are hereby incorporated by reference herein in their entireties and for all purposes.

INTRODUCTION

In one aspect, this disclosure relates to systems and circuitry for and/or methods of establishing communication between (1) an activity, biometric and/or environmental sensor device (for example, an activity monitoring device such as any device described and illustrated in U.S. patent application Ser. No. 13/156,304, entitled "Portable Monitoring Devices and Methods of Operating Same", filed Jun. 8, 2011) having one or more activity, biometric and/or environmental sensors and active and/or passive wireless "transmitter" unit (for example, near field communication "NFC" transmitter) to transmit an identification tag associated with the sensor device, and (2) a processing device having wireless receiver (for example, NFC reader circuitry) to detect the identification tag of the activity, biometric and/or environmental sensor device wherein, in response to detecting the identification tag, the processing device may execute an application or implement an operation associated with or corresponding to the detected identification tag.

BACKGROUND

Briefly, users of electronic devices typically have to learn abstract operating systems to be able to use their portable electronic devices. For example, to perform a synchronizing operation or function, a portable activity/biometric monitoring device (such as a Fitbit activity tracker) to another/second electronic device (for example, a smart phone or computer), the user navigates through one or more virtual menus or screens on the portable activity/biometric monitoring device, launches or initiates execution of the application, navigates through the application to find a synchronization menu (on the portable electronic device(s)), and finally enables, initiates and/or implements a synchronization operation between the portable activity/biometric monitoring device and the smart phone or computer. This user interaction often is not as intuitive as many other physical interactions. For example, to open an automatic door, one simply has to move in front of the door and it opens. This interaction with the automatic door is so natural and intuitive that someone completely unfamiliar with an automatic door would be able to open it. In one aspect, the present inventions described herein aim or are directed to replace non-intuitive user interactions found in conventional user interfaces with more intuitive interactions, for example, as natural as the automatic door.

BRIEF DESCRIPTION OF THE DRAWINGS

In the course of the detailed description to follow, reference will be made to the attached drawings. These drawings show different aspects of the present inventions and, where appropriate, reference numerals illustrating like structures, components, materials and/or elements in different figures are labeled similarly. The various embodiments disclosed herein are illustrated by way of example, and not by way of limitation, in the figures of the accompanying drawings and in which like reference numerals refer to the same and/or similar structures/components/features/elements. It is understood that various combinations of the structures, components, features and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

FIG. 2A illustrates, in flowchart form, exemplary operations of a sensor or proxy device having the NFC tag physically coupled thereto;

FIG. 2B illustrates, in flowchart form, exemplary operations of a processing device launches, runs and/or executes one or more applications and performs operations in response to detecting the presence of a sensor or proxy device having an NFC tag;

Figure 3A:
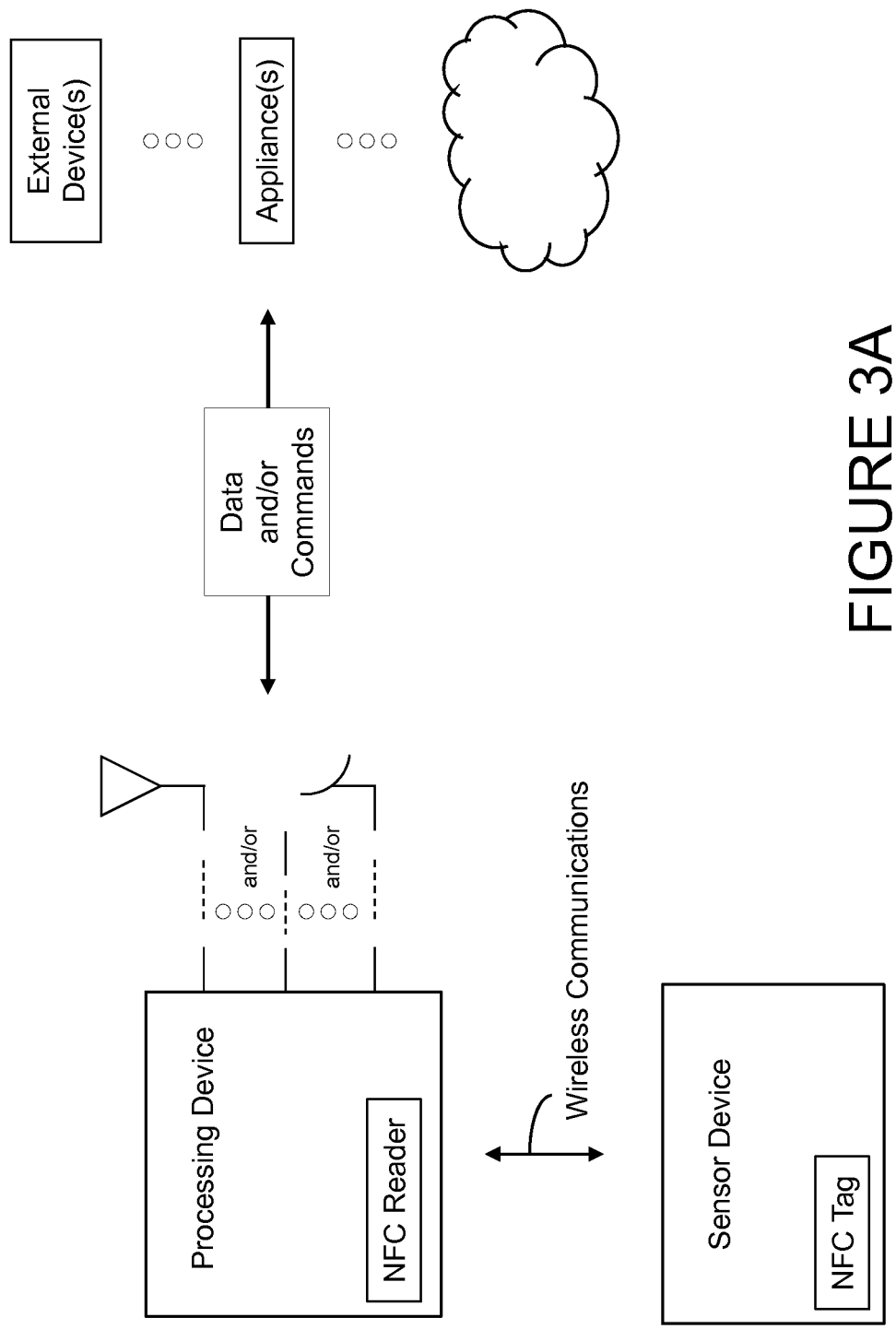
FIGS. 3A and 3C illustrate, in block diagram form, a processing device having an NFC reader and a sensor device having an NFC tag, whereby the processing device wirelessly communicates with the NFC tag of the sensor device and, in response initiates communication (of, for example, data and/ or commands) with one or more external devices, appliances and/or networks (for example the Internet), in accordance with one or more exemplary embodiment of the present inventions, wherein in one embodiment, the processing device, in response to determining the identification data of the NFC tag, executes one or more applications or implements one or more operations associated with or corresponding to the detected NFC tag (for example, an application/operation which implements communication, synchronization and/or pairing with associated external devices, appliances and/or a network (for example, the Internet), in accordance with one or more exemplary embodiment of the present inventions; notably, the processing device may send and receive data and/or commands to and from the sensor device and/or one or more associated external devices, appliances and/or a network (for example, the Internet which are associated with the NFC tag of the sensor device; here, a sensor device having an NFC tag is wirelessly read by a processing device and, in response, initiates, enables and/or provides communication with one or more external devices, appliances and/or networks (which may provide, enable and/or facilitate cloud computing resources)
Figure 3B:
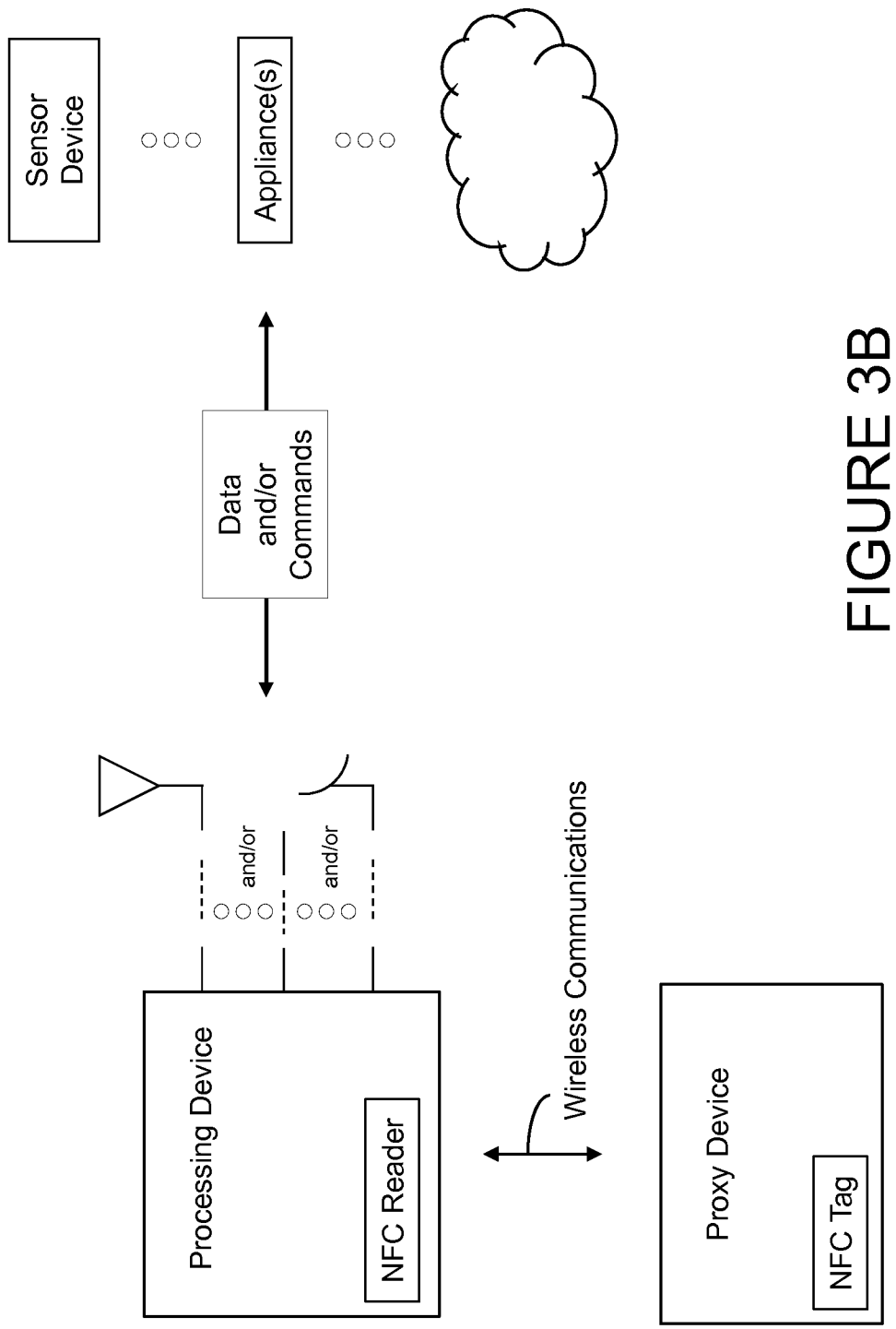
Figure 5:
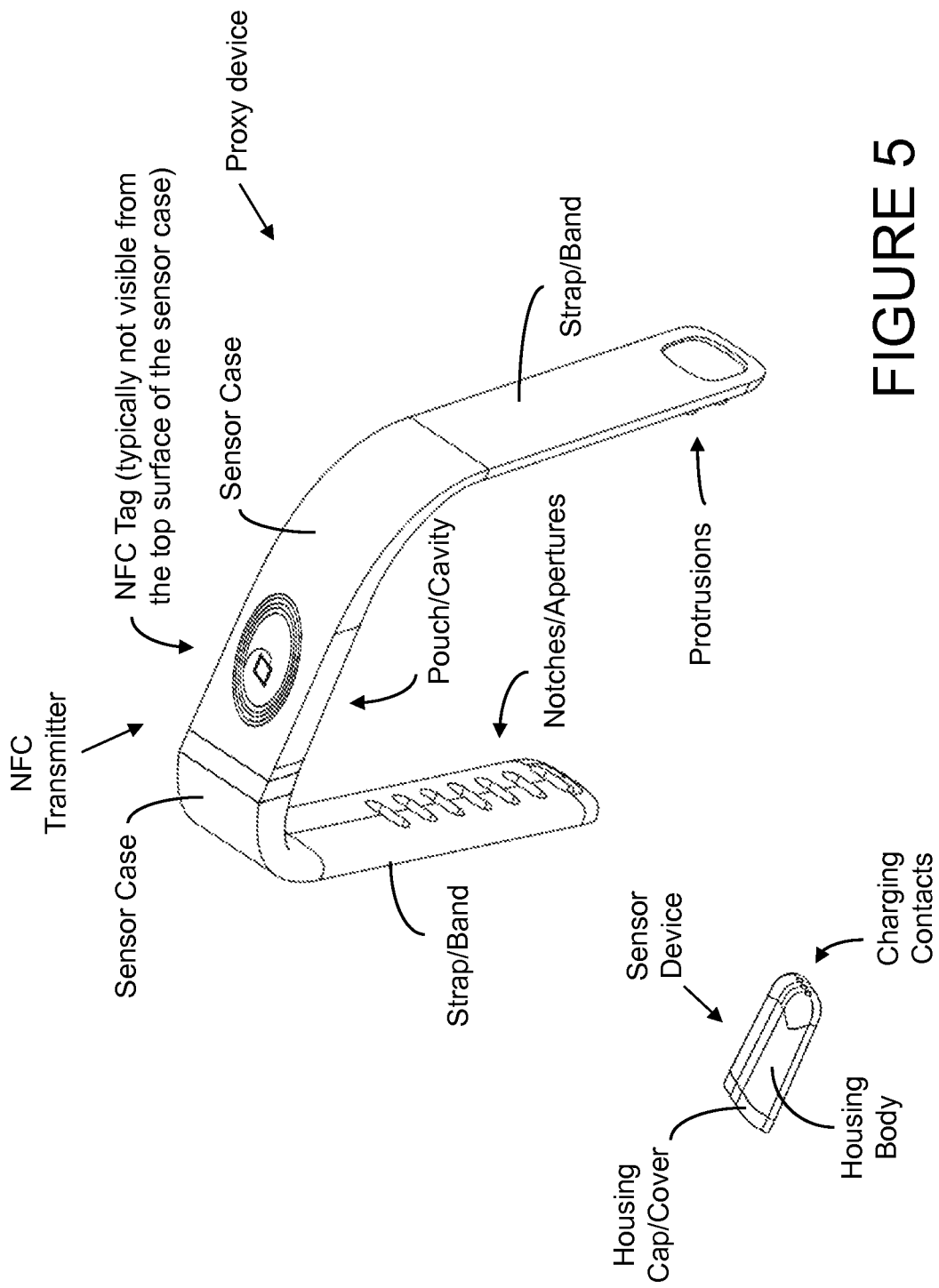
Figure 6:
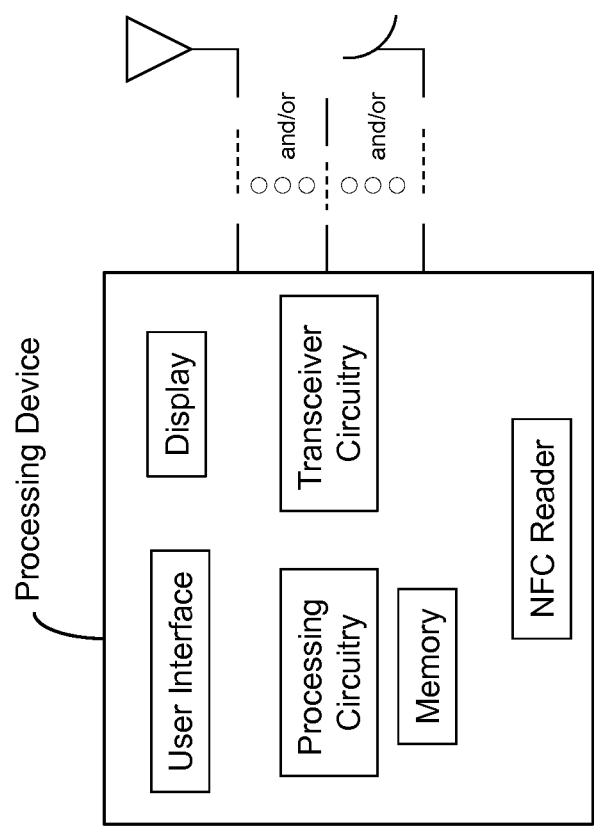

FIG. 3B illustrates, in block diagram form, a processing device having an NFC reader and a proxy device having an NFC tag, whereby the processing device wirelessly communicates with the NFC tag of the sensor device and, in response initiates communication (of, for example, data and/or commands) with one or more sensor devices, appliances and/or networks (for example the Internet), in accordance with one or more exemplary embodiment of the present inventions, wherein in one embodiment, the processing device, in response to determining the identification data of the NFC tag, executes one or more applications or implements one or more operations associated with or corresponding to the detected NFC tag (for example, an application/operation which implements communication, synchronization and/or pairing with associated external devices, appliances and/or a network (for example, the Internet), in accordance with one or more exemplary embodiment of the present inventions; notably, the processing device may send and receive data and/or commands to and from one or more associated sensor devices, appliances and/or networks (for example, the Internet) which are associated with the NFC tag of the sensor device; here a proxy device having an NFC tag is wirelessly read by a processing device and, in response, initiates, enables and/or provides communication with one or more sensor devices, appliances and/or networks (which may provide, enable and/or facilitate cloud computing resources);

FIGS. 4A and 4B illustrates an exemplary sensor device having an NFC tag disposed in the housing of the sensor device, in accordance with one or more exemplary embodiment of the present inventions; notably, the NFC tag is disposed in the housing to, for example, protect the NFC tag from damage and/or wear and tear during normal use by the user; although the NFC tag is illustrated here to be disposed in the housing, such NFC tag may be physically coupled and/or fixed to an outer or exposed surface of the sensor device; indeed, an NFC tag may be secured and/or coupled to the sensor device using any technique or mechanism now known or later developed;

FIG. 5 illustrates a proxy device in conjunction with an associated sensor device, in accordance with one or more exemplary embodiment of the present inventions, wherein the proxy device includes a sensor case in which the sensor device resides during operation, and an NFC tag which is associated with the sensor device; straps/bands attached to the proxy device may be employed to physically secure or couple the proxy device to a user during operation; notably, although illustrated as being disposed on or fixed to a top surface of the sensor case, the NFC tag may be embedded within the case or band (to reduce or minimize potential for damage), disposed on or fixed to a bottom (or skin surface) of the sensor case, and/or disposed on or fixed to an inner wall of an internal pouch that is accessible via the bottom or skin side of the sensor case; and FIG. 6 illustrates in block diagram form an exemplary processing device according to one or more embodiments of the present inventions; notably, the exemplary processing device may be an electronic device, for example, a desktop computer and/or a portable electronic device such as, for example, mobile phone, PDA, laptop and tablet.

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed separately herein.

Moreover, many other aspects, inventions and embodiments, which may be different from and/or similar to, the aspects, inventions and embodiments illustrated in the drawings, will be apparent from the description, illustrations and claims, which follow. In addition, although various features and attributes have been illustrated in the drawings and/or are apparent in light thereof, it should be understood that such features and attributes, and advantages thereof, are not required whether in one, some or all of the embodiments of the present inventions and, indeed, need not be present in any of the embodiments of the present inventions.

DETAILED DESCRIPTION

At the outset, it should be noted that there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed separately herein.

Further, in the course of describing and illustrating the present inventions, various circuitry, architectures, structures, components, functions and/or elements, as well as combinations and/or permutations thereof, are set forth. It should be understood that circuitry, architectures, structures, components, functions and/or elements other than those specifically described and illustrated, are contemplated and are within the scope of the present inventions, as well as combinations and/or permutations thereof.

With that in mind, in one aspect, the present inventions are directed to a system including (1) one or more activity, biometric and/or environmental sensor devices (for example, an activity monitoring device such as any device described and illustrated in U.S. patent application Ser. No. 13/156,304, entitled "Portable Monitoring Devices and Methods of Operating Same", filed Jun. 8, 2011) having one or more activity, biometric and/or environmental sensors and one or more active and/or passive wireless "transmitter" circuitry (for example, near field communication "NFC" transmitter) to transmit an NFC tag associated with the sensor device, and (2) a processing device (for example, a portable electronic device, for example, a mobile phone, PDA and tablet) and/or computer (or the like) having wireless receiver (for example, NFC reader circuitry) to detect the identification data of the NFC tag of the activity, biometric and/or environmental sensor device wherein, in response to determining the identification data of the NFC tag, the processing device executes one or more applications or implements one or more operations associated with or corresponding to the detected NFC tag (for example, an application/operation which implements communication (for example, communication of data and/or command (such as, for example, sensor configuration data), synchronization and/or pairing function). Notably, one or more applications or operations associated with or corresponding to the detected NFC tag may be one or two way active communication, for example, between the sensor device, the processing device, one or more external devices, and/or one or more networks (for example, the Internet).

Figure 1A:
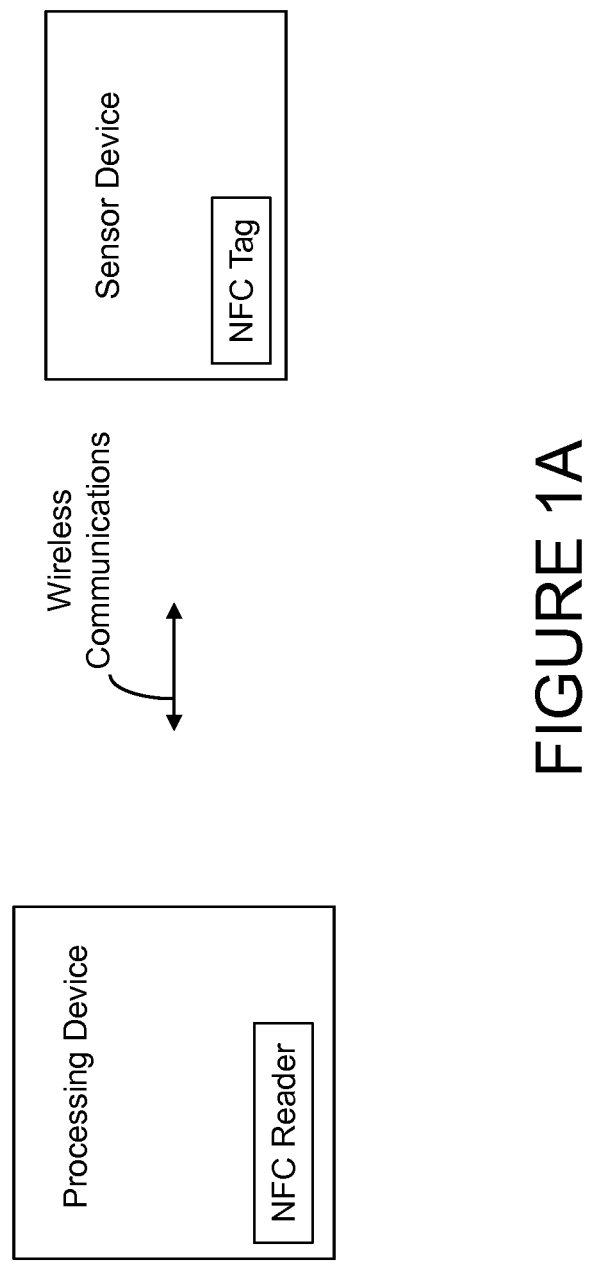
FIG. 1A illustrates, in block diagram form, a processing device having an NFC reader and a sensor device having an NFC tag, whereby the processing device may wirelessly communicate with the NFC tag of the sensor device whereby in response to determining the identification data of the NFC tag, the processing device may execute one or more applications or implement one or more operations (for example, an application/operation which implements communication (for example, communication of data and/or command—such as, for example, sensor configuration data), synchronization and/or pairing with associated with a sensor device) associated with or corresponding to the detected NFC tag, in accordance with one or more exemplary embodiment of the present inventions.
Figure 1B:
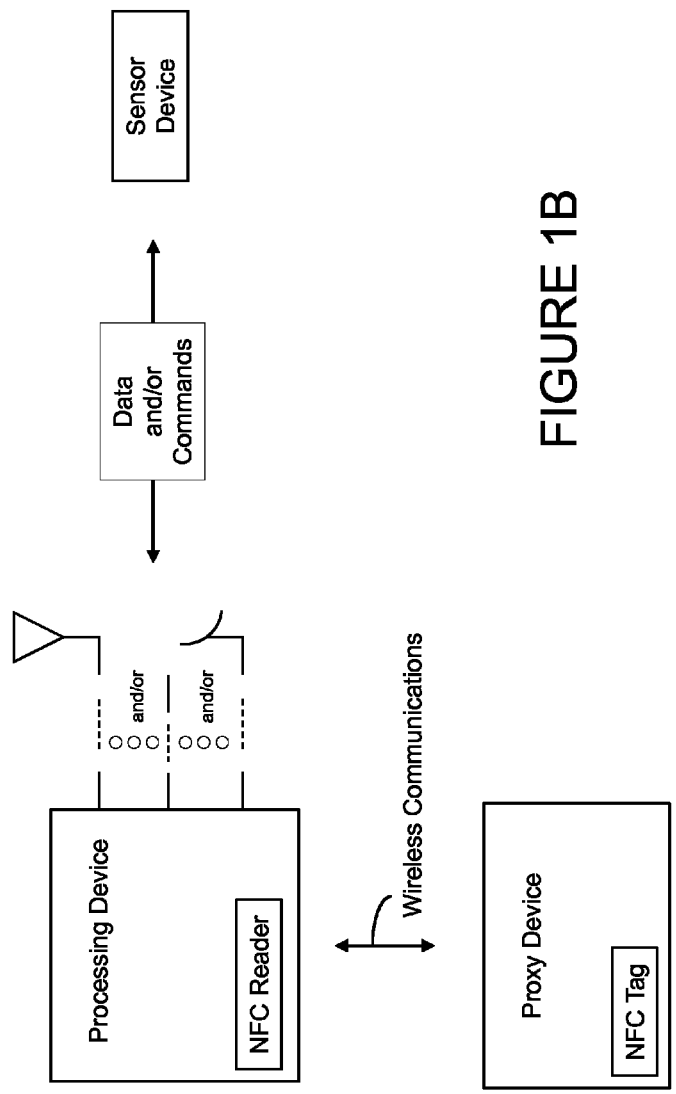
FIG. 1B illustrates, in block diagram form, a sensor device, a processing device having an NFC reader and a proxy device having an NFC tag, whereby the processing device may wirelessly communicate with the NFC tag of the proxy device, in accordance with one or more exemplary embodiment of the present inventions, wherein in one embodiment, the processing device, in response to determining the identification data of the NFC tag, may execute one or more applications or implement one or more operations associated with or corresponding to the detected NFC tag (for example, an application/operation which implements communication (for example, communication of data and/or command—such as, for example, sensor configuration data), synchronization and/or pairing with the associated sensor device), in accordance with one or more exemplary embodiment of the present inventions; notably, the processing device may send and receive data and/or commands to and from a sensor device which is associated with the NFC tag of the proxy device (which, in turn, is associated with a sensor device)

In one embodiment, the present inventions are based on an NFC protocol wherein the activity, biometric and/or environmental sensor device includes a NFC antenna and radio (or equivalent) and the processing device includes an NFC reader or receiver. (See, FIG. 1A). In operation, the processing device, upon detecting the presence of the activity, biometric and/or environmental sensor device and/or a proxy device thereof, launches, runs and/or executes one or more applications that are associated with, corresponds to and/or is appropriate for the sensor device. Here, the NFC antenna and radio associated with the sensor device may be physically coupled to or embedded in the sensor device and/or separate therefrom wherein, under these circumstances, the NFC antenna and radio/transmitter associated with the sensor device may be (in addition to, or in lieu of being physically coupled to or embedded in the sensor device) physically coupled to or embedded in a proxy device which is detected by the processing device (see FIG. 1B). The proxy device (for example, a case to which or in which the sensor device may be attached or stored during use see, for example, FIG. 5), or an object frequently in proximity of the sensor device such as a watch, running shoes or exercise equipment) is associated with the sensor device. In this way, a processing device (having the NFC reader) may launch one or more applications that are associated with, corresponds to and/or is appropriate for the sensor device even where, for example, the sensor device is not (i) in proper, suitable or close proximity to the processing device, (ii) physically coupled to the NFC antenna and/or transmitter and/or (iii) includes and/or is physically, readily and/or easily accessible. (See, FIG. 1B).

In one embodiment, the processing device (for example, mobile phone, tablet or the like) launches, runs and/or executes an application (which may also have been available, present or running in the background) that accesses and/or retrieves data from, for example, resident memory, one or more external devices and/or one or more networks (for example, one or more the sites on the Internet). The processing device may include transmitter and receiver circuits (hereinafter collectively "transceiver") which employ one or more wired or wireless communication protocols, techniques and/or systems to access and/or retrieve data (for example, the data from one or more external devices and/or one or more networks (for example, one or more the sites on the Internet). Here, the wired or wireless communication protocols, techniques and/or systems may be different from the NFC protocol, technique and/or system employed to interrogate the NFC tag and obtain or acquire the identification information form the sensor device. The acquired data, in one embodiment, is associated with and/or corresponds to the activity, biometric and/or environmental sensor device (or the user thereof). For example, such data may be any activity, biometric and/or environmental information now known or later developed, including current and/or historical data corresponding to calories, steps, distance, stairs, floors, altitude, location, body heat, galvanic skin response, heart rate, respiration, blood pressure, stress, blood sugar levels, $SpO_2$, sleep quality, temperature, infrared or thermal signature, motion, vibration, temperature, humidity, air quality, pressure, weight, body fat. Thereafter, the processing device may output the data to the user—for example, display the data.

In addition thereto, or in lieu thereof, the processing device (for example, mobile phone, tablet or the like) launches, runs and/or executes one or more applications (which, again, may also have been available, present or running in the background) which, for example, access, synchronize and/or retrieve data, for example, activity, biometric and/or environmental sensor data, from the sensor device. In addition, the processing circuitry may thereafter forward/transmit such data (or data based on the retrieved data) to one or more external devices and/or networks (for example, the Internet). The processing device may also output the retrieved data to a display associated with the processing device and thereby display such data to the user.

Notably, a sensor device may also be a processing device (having the NFC reader). For example, in one embodiment, the sensor device, under certain conditions, operates or functions as a sensor device (including an NFC antenna and/or transmitter) and, under other conditions, may be a processing device (including an NFC reader) which executes one or more applications or operations associated with a different sensor device or a proxy device which is associated with different sensor device (having an NFC antenna and/or transmitter) upon detecting the presence of the sensor device and/or a proxy device.

The present inventions may employ any short-range wireless communication protocol, technique and system now known or later developed including, for example, NFC, RFID or Bluetooth protocols, techniques and systems. Thus, although embodiments of the inventions are described herein in the context of an NFC communication protocol, technique and system, the present inventions may be implemented in any short-range wireless communication protocol, technique and/or system (for example, wireless communications of less than 20 feet, and preferably less than 2 feet, and more preferably, less than 1 foot). For the sake of brevity, discussions in such other protocols, techniques and/or systems will not be repeated.

Thus, when a sensor device and/or proxy device comes into proximity of a processing device which is equipped with an NFC reader, the sensor device and/or proxy device transmits identification data associated with the sensor device. The identification data may uniquely identify the particular sensor device. In another embodiment, the identification data may also correspond to the general type or class of sensor device or it may correspond to a group of sensor devices. The identification data may contain any type of information/data including character-based, numeric, alphabetic, URL, and/or combinations thereof The identification data may contain any information and/or data now known or later developed that may be employed to uniquely identify the sensor device, type of sensor device, group of sensor devices, and/or proxy device or devices. (See, FIGS. 2A and 2B). Indeed, the identification data may also contain information to simultaneously identify two or more of the particular sensor device, type of sensor device and/or group of sensor devices and/or proxy device or devices. The identification data may also contain information about actions and/or operations that should be or are to be performed in associated with the particular sensor device, type of sensor device and/or group of sensor devices and/or proxy device or devices.

Figure 3C:
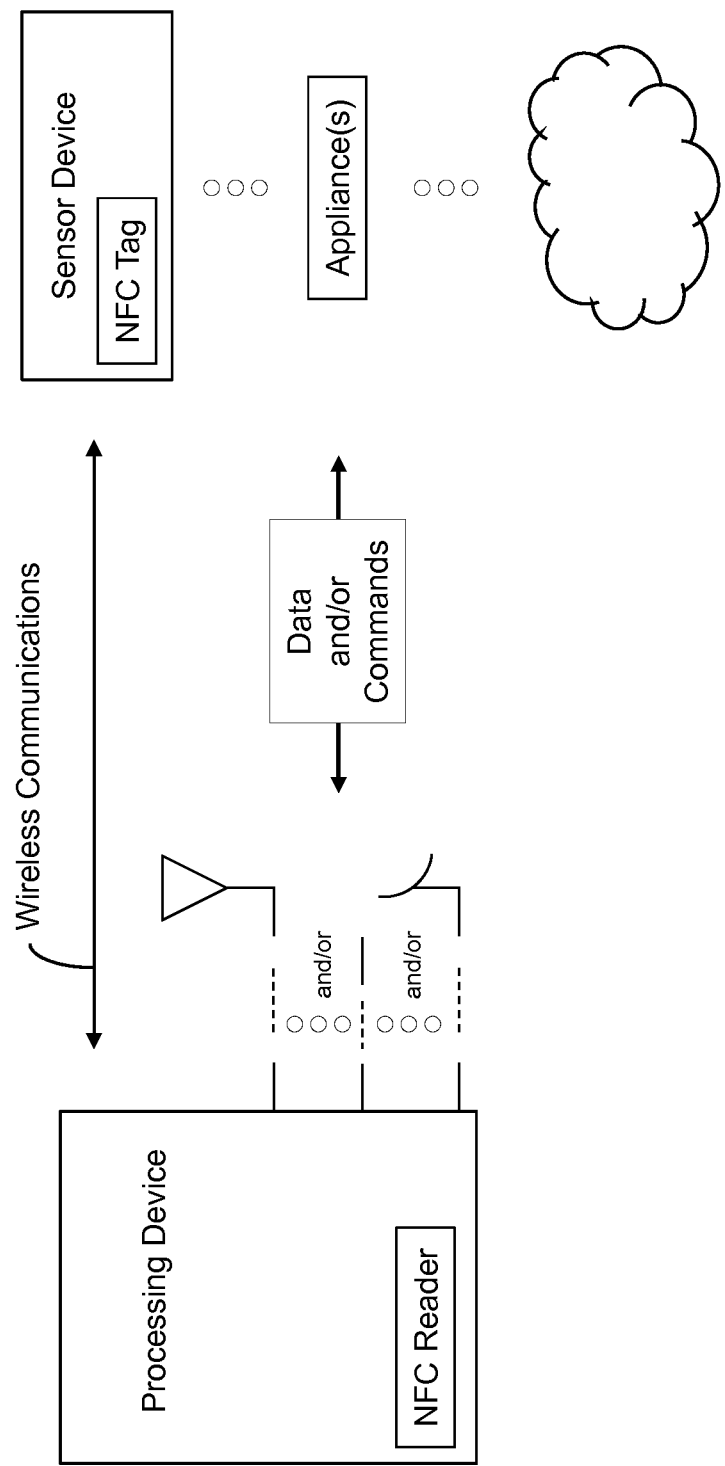

The NFC reader in the processing device uses the identification data of the NFC tag to automatically launch or execute one or more applications or implement one or more operations associated with the NFC tag, sensor device and/or proxy device (for example, an application or operation which implements communication, synchronization and/or pairing with associated external devices, appliances and/or a network (for example, the Internet). In addition thereto, or in lieu thereof, the application may already be operating, executing and/or running, for example, as a background task in the NFC reader's operating system or as an integrated and integral part of the NFC reader's operating system or functionality. Thereafter (for example, immediately thereafter), the one or more applications may implement one or more of the following actions, operations and/or functions, and/or facilitate the user to implement and/or perform actions, operations and/or functions via a user interface of the processing device:

Display, manipulate, transmit (for example, to the Internet), store and/or analyze information acquired from the sensor device via NFC communication. Data and/or instructions may also be transmitted to and stored in the sensor device and/or proxy device via NFC communication channel (and/or separate communication channel). (See, FIGS. 3A, 3B and 3C).

Initiate connection to the sensor device via another communication technique and/or protocol (for example, communication via Bluetooth, Bluetooth Low Energy (BTLE), WiFi, GSM or other cellular technology) using the NFC communication circuitry/technique or other communication circuitry/technique (for example, wired, wireless and/or optical techniques including IR, optical, audio, haptic, etc.). (See, FIGS. 1B, 3B and 3C). In one embodiment, after connection is established, the application may implement bi-directional communication over the NFC communication channel or other communication channel. Where the sensor device includes a display, the sensor device may display any data and/or commands (on the sensor device). Such data/commands may be from the processing device, appliance or network (for example, the Internet). Notably, the data and/or commands may be transferred in real-time and/or in mass or bulk at, for example, a prescribed time. Moreover, the initiation of the subsequent communication and/or connection with the sensor device may be immediate upon launch, initiation and/or execution of the application or sometime thereafter (for example, a predetermined time after launch, initiation and/or execution of the application.

Acquire NFC tag from proxy device and initiate connection to the sensor device, an appliance and/or the internet via another communication technique and/or protocol (for example, communication via Bluetooth, Bluetooth Low Energy, WiFi, GSM or other cellular technology) using the NFC communication circuitry/technique or other communication circuitry (for example, wired, wireless and/or optical techniques). (See, FIGS. 1B and 3B). After connection (for example, communication channel) is established with the sensor device, an appliance and/or the Internet, the application may be bi-directional communication of data and/or commands (for example, synchronization and/or sensor configuration data) between the processing device and such sensor device, appliance and/or the Internet.

Display on the processing device a "virtual" user interface of the sensor device, for example, a user interface that facilitates or allows a user to configure the sensor device. Configuration data may include, for example, setting the date/time on the sensor device, setting network configuration (such as WiFi network and password), adjusting the illumination of the display, volume of audio output and/or intensity of vibration, input user's biometric information (for example, height, weight, gender, age, etc.), enabling or disabling communication circuitry (for example, turning-off any transmitters or receivers (i.e., place the sensor in an "airplane" mode) and/or any other action that alters the behavior or user interface of the sensor device. The configuration data may be transmitted over NFC communication channel or via another/different mechanism or communication protocol, technique and/or system (for example, Bluetooth).

Display on the processing device a user interface that allows or facilitates a user to initiate a social connection ("friendship") with another user via the sensor device. This social connection may be stored on the processing device, sensor device, and/or transmitted to an external service, device or website.

Display on the processing device a user interface that allows or facilitates a user to invite another user to an event or group. An event may be virtual or physical and may include collaborative or competitive competitions or games. A group may be physical or virtual.

Display on the processing device a user interface that allows or facilitates a user to create and or send an annotation or marker into the data collected by the sensor device. An annotation or marker may indicate an event or activity, for example, a start and/or stop of an activity performed or conducted by the user (for example, a period of running, walking, bicycling, sleeping or swimming). The annotation or marker may be transmitted to the sensor device and stored in the memory or inserted in the data stored in the sensor device. Alternatively, the annotation or marker may be transmitted to another device or computer where the annotation is inserted or stored for insertion and merging with the sensor's data at a later time.

Automatically create and/or send an annotation or marker as described above. The automatic creation would be based on information in the NFC tag about predetermined actions to be performed in connection with detection of a particular sensor and/or proxy device, type of sensor device and/or group of sensor devices and/or proxy device or devices.

Display on the processing device a user interface associated with a proxy device NFC tag. In one embodiment, the proxy device and therefore user interface displayed may be associated with a specific activity and/or exercise. The processing device may also communicate with the sensor device to notify it of the identity or class of proxy device and/or the activity and/or exercise associated with the proxy device. Communication of the processing device with the sensor device may include, but is not limited to sending a first code which puts the sensor device into a mode for tracking metrics specific to the activity and/or exercise associated with the proxy device. This activity and/or exercise specific mode may cause the sensor device to change or optimize the programs and/or algorithms used to track metrics. In some embodiments, the first code may include programs and/ or algorithms which are subsequently used by the sensor device to track metrics. The processing device may determine that the user has ended and/or completed the activity and/or exercise associated with the proxy device based on, for example, (i) input from the user into the processing device and/or sensor device indicating that the user has ended and/or completed the activity and/or exercise, (ii) sensor signals from the sensor device, (iii) the signal strength of the NFC tag (for example, an inability to communicate with the associated NFC tag), (iv) completion of a preplanned or preprogrammed exercise routine, (v) detecting a second NFC tag of the proxy device which corresponds to terminating or stopping the activity and/or exercise, and/or (vi) by detecting the proxy device NFC tag a second time. In the case that the proxy device NFC tag is detected a second time, the first proxy device NFC tag may use a "toggle" metaphor wherein subsequent detections of the tag corresponds to "on" or "off." For example a first detection event may turn on the activity and/or exercise user interface and/or mode, and a second detection event may turn off the activity and/or exercise user interface and/or mode. In one example, a dumbbell is the proxy device having an NFC tag. To start an activity the user places their processing device in proximity to the dumbbell NFC tag. The processing device then shows a user interface associated with tracking dumbbell activity and communicates with the sensor device to put it into a special mode for tracking dumbbell activity. In one embodiment, the activity may be terminated or stopped via a user input (for example, the user pressing "stop", pause or the like on the processing device). In another embodiment, the activity may be terminated or stopped in response to placing or locating the processing device in proximity to the dumbbell NFC tag a second time (that is, after the initial or first time, the processing is within proximity of the NFC tag of the dumbbell to initiate or provide NFC communication therebetween). The processing device and/or sensor device may display metrics of the dumbbell activity (and/or another activity—in those instances where the user is performing that other activity) such as number of dumbbell lifts and the duration of the activity during and/or after the completion of the activity. Other proxy devices include, for example, exercise equipment, treadmills, elliptical trainers, bicycles, running shoes and/or swimming pools and may use the technique described above. Such proxy devices have particular metrics associated with the activity corresponding to the proxy device or NFC tag.

Instruct (for example, automatically) the processing device to communicate with the sensor device to establish, place or set it to an activity and/or exercise mode associated with the activity and/or exercise associated with the proxy device as described above. The automatic mode setting may be based on information in the NFC tag, the type of sensor device and/or the group of sensor devices and/or proxy device or devices.

Display on the processing device a user interface that allows a user to select a sensor device from a list of known sensor devices that match a sensor device type or from a list of sensor devices from a previously or dynamically created group of sensor devices. These lists may be retrieved from storage in the processing device and/or from another external service, device and/or website. In one embodiment, this group of sensor devices may be custom created by a user or may be dynamically created by some set of criteria determined by the user. For example, a user may have multiple temperature sensor devices in their home, one in each room. If the identifier contains information about the class of sensor device, the application may display a list of a plurality of or all temperature sensor devices of which there are one in each room. The user would then select the appropriate sensor and discover the temperature in the room that the sensor device is located in. The application (executed on the processing device) may also allow the user to switch between a particular sensor devices identified by the NFC tag, all the known devices in a class of sensor devices, or all the devices in a group. For instance, a tabbed metaphor may be used to switch between the above.

Display on the processing device a user interface that dynamically changes based on reading or not reading identifier tag(s) of a sensor device(s). For example, in one embodiment, a user may have video camera sensor devices installed in each room in their home. The application is designed to show video streams from each camera. A user may have individual NFC tags that correspond to each video camera sensor device. As the user moves the NFC reader to each tag (thereby reading the tag), the user interface dynamically changes to display the video stream originating from the video camera sensor device that corresponds to the then read tag.

Pair a sensor or proxy device to an account of a registered user on a website or external system or pair a sensor or proxy device to another device or system (for example, another sensor/proxy device, a processing device and/or a system). For example, in one embodiment, a user may be associated with the application which would query a website or external device/system to determine whether the NFC tag of the sensor or proxy device is associated with the user. If there were no existing association and if the sensor device were not associated with any other user, a pairing relationship would be automatically created between the sensor and/or proxy device and the user. If there was no user already associated with the application, the application may ask the user to login to an existing account or create a new account. The user may also choose to switch and login to a different user account. Regardless, once there was a user associated with the application, the application would then query the website to determine whether the identification data of the NFC tag of the sensor or proxy device were associated with the user. If there were no existing association and if the sensor or proxy device were not associated with any other user, the system may initiate, facilitate and/or implement a pairing relationship between the sensor and/or proxy device and the user. In another embodiment, the pairing relationship would be directly between the sensor or proxy device and another device or system (for example, another sensor/proxy device, a processing device and/or a system). In these embodiments, the pairing relationship may reside on the NFC reader itself or on the website or another device or system. The pairing may be automatic or the application may confirm at various steps with the user that the pairing should proceed.

Display a user interface on the processing device that allows the user to pair to or unpair a sensor or proxy device from an account of a registered user on website or system. This user interface may also allow a user to pair or unpair a sensor or proxy device from another device or system. The user interface may be presented immediately upon execution, initiation and/or launch of the application or may be accessed via a button, tab, or some other visual metaphor.

The activity, biometric and/or environmental sensor device may include suitable sensors to acquire any activity, biometric and/or environmental information now known or later developed, including calories, steps, step count, distance, stairs, floors, altitude, location, body heat, galvanic skin response, heart rate, respiration, blood pressure, stress, blood sugar levels, $SpO_2$, sleep quality, temperature, infrared or thermal signature, motion, vibration, temperature, humidity, air quality, pressure, weight, body fat. The sensor device may also acquire video or photographic information via a camera or cameras. As noted above, the sensor device of the present inventions may be any activity, biometric monitoring device described and illustrated in U.S. patent application Ser. No. 13/156,304, entitled "Portable Monitoring Devices and Methods of Operating Same", filed Jun. 8, 2011. Moreover, the sensor device of the present inventions may be any device described and illustrated in U.S. patent application Ser. No. 13/346,275, entitled "Biometric Monitoring Device having a Body Weight Sensor, and Methods of Operating Same", filed Jan. 9, 2012. Indeed, the sensor device of the present inventions may include any of the activity, biometric and/or environment sensors described and illustrated in U.S. patent application Ser. Nos. 13/156,304 and/or 13/346,275.

For example, with reference to FIGS. 4A and 4B, an exemplary sensor device may include an NFC transmitter (an NFC tag and antenna) disposed on or secured to a sensor/electronics unit structure or substrate (which, in one embodiment, includes one or more activity, biometric and/or environmental sensors) and disposed in a housing of the sensor device. Here, the NFC transmitter responsively outputs data which is representative of the NFC tag to an NFC reader of, for example, a processing device. In response, the processing device uses the identification data of the NFC tag to, for example, automatically launch or execute one or more applications or implement one or more operations associated with the NFC tag, sensor device and/or proxy device (for example, an application or operation which implements communication, synchronization and/or pairing with associated external devices, appliances and/or a network (for example, the Internet). (See, for example, FIGS. 3A-3C).

Notably, by disposing the NFC transmitter in the housing of the sensor device, it is protected from inadvertent damage (for example, when being disposed on or coupled to the user during normal operation). The NFC transmitter, however, may be physically coupled to any location on the sensor device (for example, sensor/electronics unit structure or substrate) using any technique or mechanism now known or later developed (for example, on the outer or exposed surface of the sensor device and/or within a housing of the sensor device).

As noted above, the sensor device may also include a separate or different wireless transmitter and receiver circuits (hereinafter collectively "transceiver") (for example, a Bluetooth (for example, Bluetooth Low Energy (BTLE)) radio circuit and antenna) to facilitate two-way communication with, for example, the processing device, application and/or network—including communication of data and/or commands (such as, for example, sensor configuration data, synchronization and/or pairing with the processing device). (See, for example, FIG. 3C). For example, with reference to FIG. 4B, wireless transceiver may also be disposed on or secured to the sensor/electronics unit structure or substrate and disposed in the housing of the sensor device. This wireless transceiver may employ the same or a different wireless communication protocol, technique and system relative to the NFC transceiver discussed above. Indeed, the wireless transceiver may employ any protocol, technique and system now known or later developed including, for example, NFC, RFID or Bluetooth protocols, techniques and systems. Here, the transceiver circuitry and antenna facilitate communication with the processing device. In response, the processing device may execute, initiate and/or launch an application and/or implement one or more operations, for example, communication of data and/or commands—such as, for example, sensor configuration data, synchronization and/or pairing with the processing device. (See, for example, FIG. 3C).

In another embodiment, the sensor device includes an integrated wireless transceiver to (i) initially and responsively output identification data which is representative of the NFC tag to an NFC reader of, for example, a processing device, and (ii) to subsequently facilitate two-way communication with, for example, the processing device, application and/or network—including communication of data and/or commands (such as, for example, sensor configuration data, synchronization and/or pairing with the processing device). This wireless transceiver may employ a single or multiple wireless communication protocols, techniques and systems. Indeed, the wireless transceiver may employ any protocol, technique and system now known or later developed including, for example, NFC, RFID or Bluetooth protocols, techniques and systems.

As noted above, in certain embodiments, the sensor device is associated with a proxy device that includes one or more NFC tags which may be used by a processing device to identify the sensor device associated with the proxy device. For example, with reference to FIG. 5, in one exemplary embodiment, the proxy device includes an internal pouch or cavity (which is exposed on the skin side of the case) to store the sensor device during operation (when this proxy device is physically attached to the user). With continued reference to FIG. 5, the proxy device includes a sensor case having a cavity or pouch in which the sensor device resides during operation, and an NFC tag which is associated with the sensor device. The NFC tag may be disposed on or fixed to a surface of the sensor case (for example, a top surface), the NFC tag may be embedded within the case or band (to reduce or minimize potential for damage), disposed on or fixed to a bottom (or skin surface) of the sensor case, and/or disposed on or fixed to an inner wall of the internal pouch or cavity that is accessible via the bottom or skin side of the sensor case.

Notably, the sensor case may include an attachment mechanism to secure the sensor case (containing the sensor device (which, in one embodiment, includes one or more activity, biometric and/or environmental sensors)) to the user during operation. For example, with reference to FIG. 5, in one illustrative embodiment, the sensor case is physically coupled to the user via straps/bands having protrusions or posts (or the like) on the first strap/band to engage notches or apertures on the second strap/band to secure the sensor case to the user (for example, to a wrist, arm or leg). Notably, any mechanism now known or later developed may be employed to physically couple the sensor case to the user. For example, the sensor case may be attached to a band (like, for example, an arm or wrist/watch band). Indeed, sensor case need not include any attachment mechanism and may, for example, be physically coupled or "attached" to the user via being disposed in a pocket of clothing of the user.

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions.

As noted above, although embodiments of the inventions are described herein in the context of an NFC communication protocol, technique and system, the present inventions may be implemented using other wireless communication protocols, techniques and systems. In this regard, the present inventions may employ any short-range (for example, less than 20 feet, and preferably less than 2 feet, and more preferably, less than 1 foot) wireless communication protocol, technique and/or system now known or later developed including, for example, NFC, RFID or Bluetooth protocols, techniques and/or systems. As such, although detailed embodiments were directed to NFC system and techniques, the present inventions may employ any communication technique and/or protocol may be any short-range wireless technology (for example, less than 20 feet, and preferably less than 2 feet, and more preferably, less than 1 foot) including, for example, NFC, RFID or Bluetooth techniques, system and protocols. For the sake of brevity, discussions in such other protocols, techniques and/or systems will not be repeated.

Further, each activity, biometric and/or environmental sensor device may include a plurality of NFC transmitters or tags to transmit a plurality of identification data associated with the sensor device. In this embodiment, the processing device detects one or more NFC tags of the sensor device wherein, in response thereto, the processing device executes one or more applications or implements one or more operations associated with or corresponding to the detected NFC tag(s) (for example, an application/operation which implements communication of data and/or command (such as, for example, sensor configuration data) in connection with a first NFC tag, synchronization in connection with a second NFC tag, and/or pairing function in connection with a third NFC tag).

As noted above, the NFC tag may contain identification data that uniquely identifies the particular sensor device. In another embodiment, the NFC tag includes identification data that may correspond to the general type or class of sensor device or it may correspond to a group of sensor devices. Such identification data may contain any type of information/data including character-based, numeric, alphabetic, URL, and/or combinations thereof. The identification data of the NFC tag may contain any information and/or data now known or later developed that may be employed to uniquely identify the sensor device, type of sensor device, group of sensor devices, and/or proxy device or devices. Indeed, the identification data may also contain information to simultaneously identify two or more of the particular sensor device, type of sensor device and/or group of sensor devices and/or proxy device or devices. In addition, the identification data in the NFC tag may also contain information about actions and/or operations that should be or are to be performed in association with the particular sensor device, type of sensor device and/or group of sensor devices and/or proxy device or devices.

Indeed, the present inventions are neither limited to any single aspect nor embodiment thereof, nor to any combinations and/or permutations of such aspects and/or embodiments.

Moreover, each of the aspects of the present inventions, and/or embodiments thereof, may be employed alone or in combination with one or more of the other aspects of the present inventions and/or embodiments thereof.

Notably, a "circuit" means, among other things, a single component (for example, electrical/electronic) or a multiplicity of components (whether in integrated circuit form, discrete form or otherwise), whether (i) digital and/or analog and/or (ii) active and/or passive, which are coupled together to provide or perform a desired operation. In addition, "circuitry", means, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays.

It should be noted that the circuitry disclosed herein (circuitry of the processing device, sensor device and/or proxy device) may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such structure expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the circuitry of the processing device, sensor device and/or proxy device within the computer system in conjunction with execution of one or more other computer programs including, without limitation, net-list generation programs, place and route programs and the like, to generate a representation or image of a physical manifestation of such structures. Such representation or image may thereafter be used in device fabrication, for example, by enabling generation of one or more masks that are used to form various components of the structures in a device fabrication process.

Moreover, the various circuits, techniques and structures disclosed herein may be represented via simulations using computer aided design and/or testing tools. The simulation of the circuitry of the processing device, sensor device and/or proxy device, and/or characteristics or operations thereof, may be implemented by a computer system wherein characteristics and operations of such structures, and techniques implemented thereby, are imitated, replicated and/or predicted via a computer system. The present inventions are also directed to such simulations of the inventive structures, and/or techniques implemented thereby, and, as such, are intended to fall within the scope of the present inventions. The computer-readable media corresponding to such simulations and/or testing tools are also intended to fall within the scope of the present inventions.

The term "identification tag" in the claims means, among other things an NFC tag, RFID or any other electronic ID or tag now known or later developed. The term "transceiver circuitry" in the claims means one or more transmitter circuits and one or more receiver circuits (whether or not one or more transmitter and receiver circuits incorporated or integrated into a common integrated circuit) that implement one or more wired and/or wireless communication protocols and/or techniques. The term "data" in the claims means, among other things, analog or digital data (which may be a single bit (or the like) or multiple bits (or the like)), whether encrypted and/or modulated.

Notably, the terms "first," "second," and the like, herein do not denote any order, quantity, or importance, but rather are used to distinguish one element from another. Moreover, in the claims, the terms "a" and "an" herein do not denote a limitation of quantity, but rather denote the presence of at least one of the referenced item.

What is claimed is:

1. Non-transitory computer-readable storage media storing instructions executable by one or more processors in a portable electronic device to cause operations to be performed by the portable electronic device, the operations including:
   acquiring, by the portable electronic device, sensor data from a sensor device according to a first wireless communication protocol, the sensor data including activity data related to motion of a user with whom the sensor device is physically coupled;
   transmitting, by the portable electronic device, the acquired sensor data, or metrics derived therefrom, to an external system according a second wireless communication protocol;
   receiving, by the portable electronic device, electronic identification data from an identification tag according to a third wireless communication protocol, the identification data identifying the sensor device;
   responsive to the receipt of the identification data, automatically requesting, by the portable electronic device, the transmitted sensor data, or metrics derived therefrom, from the external system according to the second wireless communication protocol;
   receiving, by the portable electronic device, the requested sensor data or metrics from the external system according to the second wireless communication protocol; and
   outputting the requested sensor data or metrics received from the external system for display on a display of the portable electronic device.

2. The media of claim 1, wherein the identification tag is within the sensor device.

3. The media of claim 1, wherein the operations further include deriving the metrics transmitted to the external system.

4. The media of claim 1, wherein the operations further include outputting the sensor data acquired from the sensor device, or the metrics derived therefrom, for display on the display.

5. The media of claim 1, wherein the operations further include transmitting configuration data to the sensor device according to the first wireless communication protocol.

6. The media of claim 5, wherein the operations further include acquiring the configuration data for the sensor device from the identification tag according to the third wireless communication protocol.

7. The media of claim 5, wherein the operations further include acquiring the configuration data for the sensor device from the external system according to the second wireless communication protocol.

8. The media of claim 1, wherein the sensor device includes a plurality of sensors for sensing the sensor data including:
   one or more motion sensors for sensing the motion; and
   one or more altitude sensors for sensing an altitude.

9. The media of claim 1, wherein the identification tag is within a proxy device physically separate from the sensor device and from the portable electronic device.

10. The media of claim 9, wherein the proxy device is located on or within an object of exercise equipment associated with the particular activity or exercise.

11. The media of claim 1, wherein the identification tag is a radio-frequency identification tag (RFID) or a near field communication (NFC) tag.

12. The media of claim 1, wherein the first wireless communication protocol is a Bluetooth communication protocol.

13. A processor-implemented method comprising:
   acquiring, by a portable electronic device, sensor data from a sensor device according to a first wireless communication protocol, the sensor data including activity data related to motion of a user with whom the sensor device is physically coupled;
   transmitting, by the portable electronic device, the acquired sensor data, or metrics derived therefrom, to an external system according a second wireless communication protocol;
   receiving, by the portable electronic device, electronic identification data from an identification tag according to a third wireless communication protocol, the identification data identifying the sensor device;
   responsive to the receipt of the identification data, automatically requesting by the portable electronic device, the transmitted sensor data or metrics derived therefrom from the external system according to the second wireless communication protocol;
   receiving, by the portable electronic device, the requested sensor data or metrics from the external system according to the second wireless communication protocol; and
   outputting, by the portable electronic device, the requested sensor data or metrics received from the external system for display on a display of the portable electronic device.

14. The method of claim 13, wherein the portable electronic device further includes:
   one or more processors; and
   transceiver circuitry for acquiring the sensor data from the sensor device, transmitting the sensor data to the external system, receiving the identification data from the identification tag, and requesting and receiving the sensor data from the external system.

15. The method of claim 14, wherein the identification tag is within the sensor device.

16. The method of claim 13, further including deriving the metrics transmitted to the external system.

17. The method of claim 13, further including outputting the sensor data acquired from the sensor device, or metrics derived therefrom, for display on the display.

18. The method of claim 13, wherein the sensor device includes a plurality of sensors for sensing the sensor data including:
   one or more motion sensors for sensing the motion; and
   one or more altitude sensors for sensing an altitude.

19. The method of claim 13, wherein the identification tag is within a proxy device physically separate from the sensor device and from the portable electronic device.

20. The method of claim 19, wherein the proxy device is located on or within an object of exercise equipment associated with the particular activity or exercise.

21. The method of claim 13, wherein the identification tag is a radio-frequency identification tag (RFID) or a near field communication (NFC) tag.

22. The method of claim 13, wherein the first wireless communication protocol is a Bluetooth communication protocol.

* * * * *